United States Patent [19]

Suzuki

[11] Patent Number: 4,848,988
[45] Date of Patent: Jul. 18, 1989

[54] COMPRESSED AIR DEHUMIDIFIER

[76] Inventor: Hisamoto Suzuki, 173, Uematsu-cho, Hamamatsu-shi, Shizuoka-ken, Japan

[21] Appl. No.: 151,602

[22] Filed: Feb. 2, 1988

[51] Int. Cl.⁴ ............................................. B01D 29/04
[52] U.S. Cl. ....................................... 55/185; 55/319; 55/320; 55/337
[58] Field of Search ................................ 55/183–188, 55/202, 203, 319–321, 337

[56] References Cited

U.S. PATENT DOCUMENTS

| | | | |
|---|---|---|---|
| 3,093,467 | 6/1963 | McLaughlin | 55/319 X |
| 3,845,840 | 11/1974 | Thrasher | 55/337 X |
| 4,662,907 | 5/1987 | Yoshida | 55/186 |
| 4,673,423 | 6/1987 | Yumlu | 55/319 |

FOREIGN PATENT DOCUMENTS 2437195  2/1975  Fed. Rep. of Germany ........ 55/187

*Primary Examiner*—Charles Hart
*Attorney, Agent, or Firm*—Wenderoth, Lind & Ponack

[57] ABSTRACT

A compressed air dehumidifying device, comprising: an external cylinder having an inlet port for the compressed air fed from the compressor, a passageway and an outlet port for the clean compressed air dehumidified and purged of oil, dirt, and dust, and a drain hole for discharging the moisture, oil, dirt, and dust out of the device; and an internal cylinder having a passageway connected to the inlet port for compressed air, orifices for explosively injecting the compressed air that are connected to the passageway, and inverted-funnel-shaped injection tubes adjoining the respective orifices and the diameter of which is gradually increased along the axis, and being formed in the external cylinder.

A compressed air dehumidifying device, comprising: a mechanism which adiabatically expands the hot, humid, and oil-, dirt-, and dust-containing compressed air fed from the compressor and can separate the hot air from the cool air; a mechanism which dehumidifies the compressed air introduced from the device inlet port by using the action of the cool air itself separated by the foregoing mechanism; a mechanism which drains out of the device the water droplets produced and accumulated by the foregoing dehumidifying mechanism; and a mechanism which mixes the hot air with the cool air separated once by the foregoing separating mechanism before discharging it as the dry air out of the device.

6 Claims, 1 Drawing Sheet

4,848,988

COMPRESSED AIR DEHUMIDIFIER

BACKGROUND OF THE INVENTION

1. Field of the Invention

This invention relates to a device which can remove extremely efficiently, simply, and reliably the moisture and water droplets in the compressed air that can be a difficulty or problem in spray painting and other various operations which use and handle compressed air.

2. Description of the Prior Art

Compressed air is extensively used in a wide variety of industries and fields. The supersaturated moisture in the compressed air can be changed into water droplets in a component, such as a pipe, when the temperature is lowered, and if the compressed air containing water droplets is used, various operational troubles may be caused. Accordingly, the moisture and water droplets must be removed by means of an appropriate device.

Prior art devices for dehumidifying the compressed air can be classified into three broad general categories:

(1) devices involving the method of dehumidifying wherein the compressed air is passed through a meandering or spiralled pipe installed in a cooler;

(2) devices involving the method of dehumidifying wherein the compressed air is passed through a fine-weave moisture absorption filter; and (3) devices involving the method of dehumidifying wherein the compressed air is processed with a centrifugal separator to deposit the moisture onto the outer peripheral wall thereof.

However, with the devices involving the method described in the foregoing category (1), the construction is complicated, and water must be used in the cooler, resulting in extremely low serviceability. With the devices involving the method described in category (2), the filter can easily become clogged, and the compressed air discharged from the compressor has a large quantity of oil, dirt and dust, promoting the filter clogging. When the filter is supersaturated with moisture, it loses its dehumidifying ability, and accordingly, the devices have a disadvantage that they require frequent filter replacement. With the devices involving the method described in category (3), a centrifugal separator running at high speed is used, and thus, the operation cannot easily be carried out.

SUMMARY OF THE INVENTION

This invention provides a compressed air dehumidifying device which does not fall into any one of the categories of the dehumidifying devices involving the conventional methods described previously, and successfully eliminates the various disadvantages of prior art devices, and the problems encountered with them. Accordingly, the object of this invention is to provide an extremely compact and lightweight device for dehumidifying compressed air that can highly effectively, simply, and reliably perform the dehumidification, which is essential for a variety of operations using and handling compressed air, which device is easy to install and operate and which eliminates the need for any power for the dehumidifying operation and requires no internal component to be replaced with a new one.

The foregoing object of this invention is accomplished in one preferred mode by providing a compressed air dehumidifying device which can lower the temperature of the hot, humid, and oil-, dirt-, and dust-containing compressed air fed from the air compressor (called the compressor hereinafter) by injecting the compressed air through the orifice of an inverted-funnel-shaped nozzle for restricted expansion and can drain out of the device the water droplets produced by cooling the humid air in a supersaturated state.

In another preferred mode, the foregoing object of this invention is accomplished by providing a compressed air dehumidifying device which can cool and dehumidify the hot, humid, and oil-, dirt-, and dust-containing compressed air fed from the compressor in the adiabatic expansion section and other pertinent sections of the device while using the waste heat generated in the expansion process to heat the dehumidified and cooled air to continuously put out dry air. This device is an improved version of the foregoing dehumidifying device, having a self-drying capability in addition to the compressed air dehumidifying function.

The advantages of this invention are as follows:

With the basic type dehumidifying device, not only the moisture but also the oil, dirt, and dust in the compressed air can be removed highly efficiently and effectively, and the clean compressed air can be drawn from the outlet port at a normal operating pressure, therefore, the various disadvantages of the foregoing prior art dehumidifying devices and the problems encountered with them are completely eliminated.

In addition, the basic type dehumidifying device has a simple construction, which results in trouble-free operation, and is compact and lightweight, permitting it to be conveniently handled and installed in any portion of a piping system through which the compressed air is passed. The basic type dehumidifying device has another advantage, namely that, by appropriately changing the diameter of the orifice of the injection tube and the number of injection tubes, an extremely wide range of flow rate and pressure requirements specified for the compressed air can be met.

With the improved type dehumidifying device, the compressed air fed into the device is dehumidified at high efficiency simply by the continuous operation of the device itself with the oil, dirt, and dust in the compressed air being filtered out, and in addition, the compressed air in the device can always be divided into hot air and the cool air at high efficiency with no need for externally supplied energy such as electrical power, and can be discharged as the dry air. Accordingly, the improved type dehumidifying device provides a unique compressed air dehumidifier.

BRIEF DESCRIPTION OF THE DRAWINGS

This invention is illustrated diagramatically in the following drawings wherein:

In FIG. 1, the numerals designate a specific part or portion of the basic type dehumidifying device A as follows:

Figure 2:
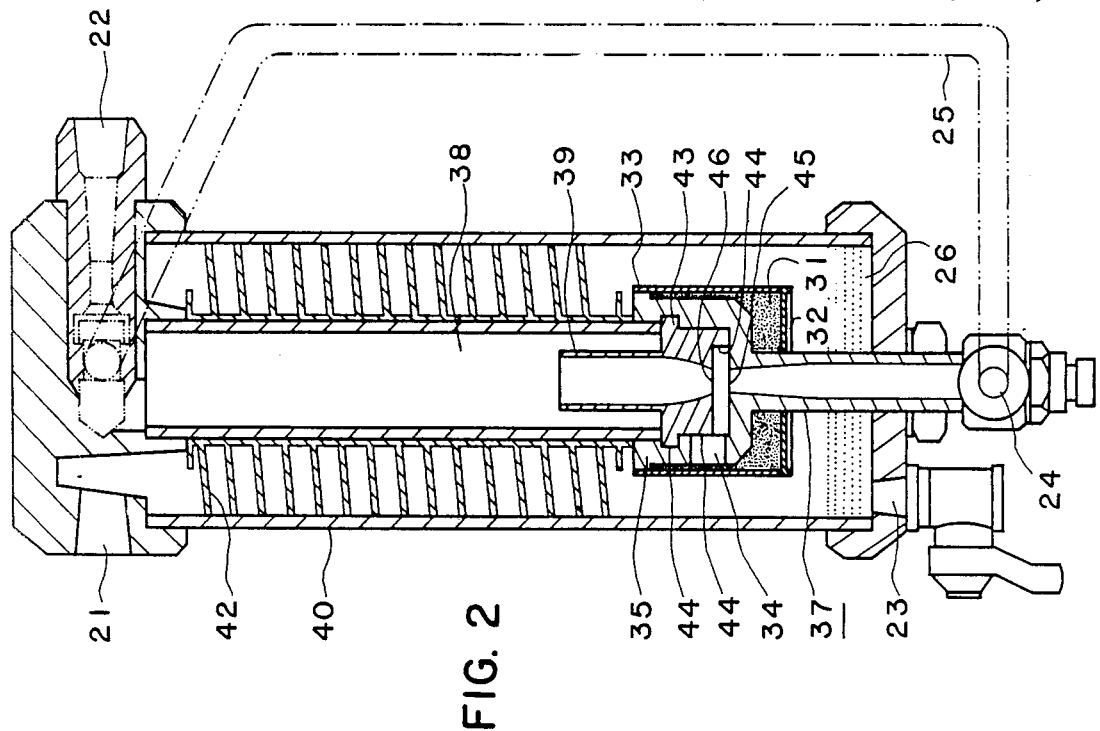
FIG. 2 is a longitudinal-sectional view of the improved type dehumidifying device B.

1: External cylinder
2: Internal cylinder
3: Compressed air inlet port
4: Dehumidified compressed air outlet port
5 and 6: Passageway
7: Injection tube
8: Glass Tube 9: Orifice
10: Baffle plate
12: Pressure gage
13: Drain hole In FIG. 2, the numerals designate a specific part or portion of the improved type dehumidified device B as follows:

21: Compressed air inlet port
22: Dry air outlet port
23: Drain hole
24: Waste heat air outlet port
25: Pipe
26: Water
31: Filter medium
32: Support
33: Housing
34: Exhaust tube opening
35: Exhaust tube end
37: Exhaust tube
38: Expansion chamber
39: Nozzle
40: Body of this device
42: Finned tube
43: Nozzle flange
44: Nozzle flange spiral groove
45: Exhaust tube opening
46: Nozzle opening

DESCRIPTION OF THE PREFERRED EMBODIMENT

Figure 1:
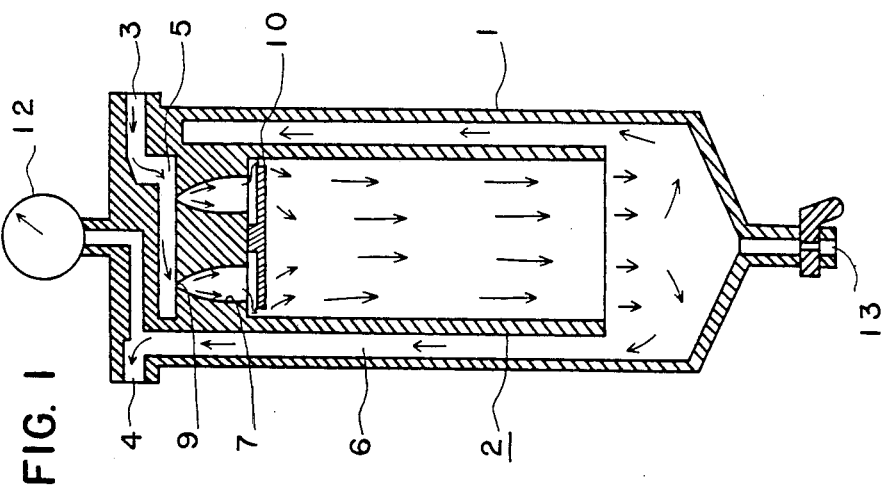
FIG. 1 is a longitudinal-sectional view of the basic type dehumidifying device A according to this invention.

Referring now to the attached drawings, preferred embodiments of this invention are described. FIG. 1 shows the basic type dehumidifying device of this invention, and FIG. 2 shows an improved version of the dehumidifying device illustrated in FIG. 1.

First, the basic type dehumidifying device of this invention as shown in FIG. 1 is described.

In the basic type dehumidifying device A, an internal cylinder 2 is formed in the external cylinder 1, and an inlet port 3 for compressed air fed from the compressor not shown in the figure and an outlet port 4 for the dehumidified compressed air are provided in the external cylinder 1. The compressed air inlet port 3 is connected to the top of the internal cylinder 2 by the passageway 5. The compressed air outlet port 4 is connected to the bottom of the internal cylinder 2 by the annular passageway 6 around the internal cylinder 2. A drain hole 13 is provided in the lower end of the external cylinder 1.

The internal cylinder 2 has injection tubes 7 in the upper section. The injection tubes 7 are have an inverted funnel shape, and are provided with an orifice 9 at the upper end opening into the passageway 5, which serves as an injection opening for the compressed air fed through the inlet port 3 and the passageway 5. The portion adjoining the orifice 9 is gradually divergent or flared outwardly. Under the injection tubes 7, one or more glass tubes 8 as shown in FIG. 1 may be provided; however, the glass tubes 8 are not indispensable components. The numeral 10 in FIG. 1 designates a baffle plate against which the compressed air collides. The baffle plate is located as close to wide end of the injection tubes as possible so that the compressed air will collide with the baffle plate 10 immediately after the injection. The numeral 12 designates an air pressure gage on the dehumidified compressed air side of the injection tubes.

Second, an improved version of the basic type dehumidifying device as shown in FIG. 1 is described as shown in FIG. 2.

Basically, the improved type dehumidifying device B as shown in FIG. 2 cools and dehumidifies the hot, humid, and oil-, dirt-, and dust-containing compressed air fed from the compressor into it by the adiabatic expansion and other pertinent sections while using the waste heat generated in the expansion process to heat the dehumidified and cooled air to continuously put out dry air.

The improved type dehumidifying device B is provided with an inlet port 21 for compressed air and an outlet port 22 for dehumidified and heated dry air that is equipped with an appropriate ejector function section; a drain hole 23 equipped with a cock or other appropriate device to drain off the water 26 resulting from the dehumidification within the device; a waste heat air outlet port 24 for taking out the generated waste heat from the device and which is equipped with an appropriate valving section, such as a needle valve or a cock; and a pipe 25 which connects the outlet port 24 to the ejector function section provided in the dry air outlet port 22.

The internal mechanism of this dehumidifying device B consists of a filter medium 31 which provides for filtration of the oil, dirt and dust from the compressed air, and which is made of pig iron grains or other material arranged and installed in a dense mass; a filter support 32 made of an appropriate material, such as a gauze, that carries the filter medium 31 on it; a housing 33 which accommodates the filter medium 31 and the support 32; an exhaust tube 37 which is inserted into an opening of the support 32, being connected to the waste heat air outlet port 24 at one end and having an opening 34 in the portion close to the other end 35 for introducing the compressed air; a funnel-shaped or otherwise similarly configured nozzle 39 one end of which is fitted into the concave portion of the exhaust tube 37 while being connected to the opening 34 in the exhaust tube 37, and the other end of which is connected to the compressed air expansion chamber 38; and a spiralled or similarly shaped finned tube 42 installed between the outer peripheral surface of the expansion chamber 38 and the inner peripheral surface of the body 40.

In the flange portion 43 of the nozzle 39 connected to the exhaust tube 37, an appropriate number of spiral grooves 44, which may differ from one another or vary in cross-sectional area, are formed to provide a swirling motion for the compressed air before it is injected into the expansion chamber 38. The opening 45 of the exhaust tube 37 connected to the flange portion 43 of the nozzle 39 is formed to have an appropriate diameter larger than that of the opening 46 of the nozzle 39. The upper end of the expansion chamber 38 is connected to the outlet port 22 for dehumidified and heated dry air that is provided with an appropriate ejector function section, and the inlet port 21 for compressed air is connected to the upper opening of the finned tube 42 on the outer peripheral surface of the expansion chamber 38.

First, the operation of the basic type dehumidifying device A as shown in FIG. 1 is described.

In the basic type dehumidifying device A features that the compressed air introduced from the inlet port 3 into the passageway 5 is explosively injected through the orifice 9 of the injection tube 7 to abruptly lower the temperature thereof so that the compressed air is supersaturated with moisture and then the moisture is removed as water droplets.

With this device A, the hot, humid, and oil-, dirt-, and dust-containing compressed air fed form the compressor not shown in the figure is introduced from the inlet port 3 into the passageway 5, reaching the orifice 9 of the injection tube 7, and is explosively injected through the orifice 9. Accordingly, the compressed air thus injected is abruptly expanded and rapidly cooled, with the result that the compressed air is abruptly and effectively supersaturated with moisture, and the supersaturated state of the air allows the moisture in the air to be removed as water droplets with extreme ease. The water droplets produced from the supersaturated compressed air drop from the internal cylinder 2 onto the lower end portion of the external cylinder 1, and are drained through the drain hole 13 to the outside of the device. In addition, the particles of the oil, dirt, and dust in the compressed air are also explosively injected from the orifice 9 of the injection tube 7, with the result that they impinge against each other to be made coarse, and are drained with the separated water droplets to the outside of the device.

Second, the operation of the improved type dehumidifying device B as shown in FIG. 2 is described.

The hot, humid, and oil-, dirt-, and dust-containing compressed air fed from the compressor is introduced from the inlet port 21 into the body 40, and then passed through the spiralled or similarly formed finned tube 42 installed on the outer peripheral surface of the expansion chamber 38 while being contacted with the finned tube 42, reaching the housing 33 which accommodates the exhaust tube 37, the nozzle 39, and other components. Then, the compressed air is introduced into the housing 33 through the gauze support 32 installed in the lower portion of the housing 33 and the filter medium 31 made of pig iron grains or other appropriate material. The oil, dirt, and dust in the compressed air are filtered out by the filter medium 31.

The compressed air introduced into the housing 33 is passed through the opening 34 of the exhaust tube 37 and then the spiral grooves 44 that are formed in the flange 43 of the nozzle 39 and which may differ from one another or vary in cross-sectional area, reaching the opening 45 of the exhaust tube 37 and the opening 46 of the nozzle 39 which differ in diameter. The spiral grooves 44 formed in the flange 43 of the nozzle 39 provide the compressed air with a swirling motion, causing it to be restriction-expanded at high efficiency, and therefore the resulting heat dissipation is highly efficient, and the dissipated-heat hot air is separated and transferred to the exhaust tube opening 45 having a diameter larger than that of the nozzle opening 46, while the adiabatic-expansion cooled compressed air thus separated from the dissipated-heat hot air is introduced into the expansion chamber 38 from the nozzle opening 46 with a diameter smaller than that of the exhaust tube opening.

The air which is thus adiabatically expanded for cooling at high efficiency and introduced into the expansion chamber 38 causes thermal conduction between it and the finned tube 42 installed on the peripheral surface of the expansion chamber 38, and therefore the hot and humid compressed air, which is introduced from the inlet port 21 and not yet adiabatic-expansion cooled, is contacted with the finned tube while the moisture is condensed into water droplets at the dew point for dehumidification of the compressed air. The water droplets are drained from the drain hole 23 in the body 40.

On the other hand, the dissipated-heat hot air resulting from the adiabatic expansion is led to the waste heat air outlet port 24 of the exhaust tube 37 and effectively sucked up to an appropriate ejector function section provided in the dry air outlet port 22, therefore, the adiabatic expansion and the separation of the heated air from the cooled air is greatly promoted.

Consequently, the hot air sucked up to the ejector function section and the cool air fed from the expansion chamber 38 are mixed with each other in the outlet port 22 and discharged as dry air out of the device. When the waste heat air outlet port 24 of the exhaust tube 37 is equipped with an appropriate valving section, such as a needle valve or a cock, the adiabatic expansion and the separation of the heated air from the cooled air can be conveniently adjusted with the valving section.

Having thus described the invention, what is claimed as new and desired to be secured by Letters Patent of the United States is:

1. A compressed air dehumidifying device comprising:

a hollow external cylinder having a closed upper end with an inlet port in the upper end of said external cylinder for compressed air supplied from a compressor, an outlet port in said upper end for the clean compressed air dehumidified and purged of oil, dirt and dust, and a drain hole in the bottom of said external cylinder for discharging the moisture, oil, dirt and dust out of the device;

a hollow internal cylinder having a closed upper end positioned with said external cylinder with said closed upper end joined to the closed upper end of said external cylinder and with the wall spaced from the inner surface of the wall of the external cylinder to define an annular passage therebetween open into said outlet port and said wall of the internal cylinder terminating short of the bottom of said external cylinder, said closed upper end of said internal cylinder having downwardly directed orifices and inverted funnel-shaped injection tubes extending downwardly therefrom into the interior of said internal cylinder the diameter of which gradually increases in the axial direction thereof, and the closed upper end of said internal cylinder further having an unobstructed compressed air passageway from said inlet port to said downwardly directed orifices for directing compressed air to said orifices for causing the compressed air to be explosively injected therethrough into said injection tubes without undergoing substantially any swirling movement.

2. A compressed air dehumidifying device comprising:

an expansion chamber having a compressed air expansion means opening thereinto for expanding compressed air adiabatically and cooling it;

a heat exchange passage along the outside of said expansion chamber in heat exchange relation with said expansion chamber and having a gas inlet at one end thereof for receiving compressed air from a compressor;

a moisture collection chamber at the other end of said heat exchange passage having means for draining liquid therefrom;

a gas passage means extending from said moisture collection chamber to said compressed air expansion means for conducting compressed air from said moisture collection chamber to said compressed air expansion means, said gas passage having a shape for swirling the compressed gas for separating the hotter part of the gas from the cooler part and for directing the cooler part into said compressed air expansion means;

warmer gas outlet means extending from said gas passage means for conducting the warmer part of the gas from said gas passage means;

a gas outlet from said expansion chamber; and warmer gas conduit means for conducting the warmer gas to said gas outlet for mixing the warmer gas with the expanded gas from said expansion chamber.

3. A compressed air dehumidifying device as claimed in claim 2 in which said warmer gas outlet means has valving means therein for controlling the flow of the warmer gas therethrough.

4. A compressed air dehumidifying device as claimed in claim 2 or 3 in which said gas outlet has an ejector means therein through which the gas from said expansion chamber is directed, and having said warmer gas conduit connected thereto for causing the low pressure of said ejector means to draw the warmer gas into said ejector means.

5. A compressed air dehumidifying device as claimed in claim 2 in which said gas passage means has a first outlet into said compressed air expansion means and a second outlet into said warmer gas outlet means, said second outlet being larger than said first outlet.

6. A compressed air dehumidifying device as claimed in claim 2 further comprising filter means in said gas passage means for filtering out oil, dirt and dust from the compressed air.

* * * * *